United States Patent
O'Herlihy et al.

(10) Patent No.: US 12,412,101 B2
(45) Date of Patent: *Sep. 9, 2025

(54) PREDICTING USER STATE USING MACHINE LEARNING

(71) Applicant: Uber Technologies, Inc., San Francisco, CA (US)

(72) Inventors: Michael O'Herlihy, San Francisco, CA (US); Rafiq Raziuddin Merchant, San Francisco, CA (US); Nirveek De, San Bruno, CA (US); Jordan Allen Buettner, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 10 days.

This patent is subject to a terminal disclaimer.

(21) Appl. No.: 18/503,108

(22) Filed: Nov. 6, 2023

(65) Prior Publication Data

US 2024/0144034 A1 May 2, 2024

Related U.S. Application Data (63) Continuation of application No. 16/944,030, filed on Jul. 30, 2020, now Pat. No. 11,847,573, which is a continuation of application No. 15/367,139, filed on Dec. 1, 2016, now Pat. No. 10,762,441.

(51) Int. Cl.
*G06N 20/00* (2019.01)
*G06N 5/02* (2023.01)

(52) U.S. Cl.
CPC .............. *G06N 5/02* (2013.01); *G06N 20/00* (2019.01)

(58) Field of Classification Search
CPC .......... G06N 20/00; G06N 5/02; G06N 7/005; G06N 99/005
USPC .......................................................... 706/46
See application file for complete search history.

(56) References Cited

U.S. PATENT DOCUMENTS

| | | | |
|---|---|---|---|
| 2009/0024546 A1* | 1/2009 | Ficcaglia ............... | G06Q 30/02 706/46 |
| 2010/0246966 A1* | 9/2010 | Fujimura ............. | G06K 9/6298 382/190 |
| 2011/0018719 A1* | 1/2011 | Huang ............... | G06Q 30/0283 340/573.1 |
| 2016/0342755 A1* | 11/2016 | Yom-Tov .............. | G06F 16/951 |
| 2017/0262445 A1* | 9/2017 | Jeon ....................... | H04L 67/306 |

(Continued)

OTHER PUBLICATIONS

United States Preinterview First Office Action, U.S. Appl. No. 15/367,139, Dec. 13, 2019, five pages.

*Primary Examiner* — Dave Misir
(74) *Attorney, Agent, or Firm* — Fenwick & West LLP (57) ABSTRACT

A system coordinates services between users and providers. The system trains a computer model to predict a user state of a user using data about past services. The prediction is based on data associated with a request submitted by a user. Request data can include current data about the user's behavior and information about the service that is independent of the particular user behavior or characteristics. The user behavior may be compared against the user's prior behavior to determine differences in the user behavior for this request and normal behavior of prior requests. The system can alter the parameters of a service based on the prediction about the state of the user requesting the service.

20 Claims, 5 Drawing Sheets

| User ID 330a | User Features 330 | | | | | Trip Features 340 | | | Unusual User State Identification 410 |
|---|---|---|---|---|---|---|---|---|---|
| | Δ Data input accuracy 330b | Δ Data input speed 330c | Δ Button click behavior 330d | Δ Device angle 330e | Δ Walking speed 330f | Location 340a | Time of day 340b | Day of week 340c | |
| 28HQ5 | 0.37 | 48 | 2 | 122 | 4.3 | 87261 | 2:26 | SAT | 1 |
| B24L9 | 0.98 | 31 | 7 | 48 | 4.0 | 34892 | 13:50 | TUE | 0 |
| 8AC87 | 0.65 | 77 | 3 | 30 | 3.2 | 21331 | 9:00 | SAT | 0 |
| ZW731 | 0.40 | 16 | 1 | 50 | 3.2 | 82910 | 23:16 | FRI | 1 |
| 18AM2 | 0.88 | 46 | 8 | 12 | 2.7 | 34101 | 1:38 | SAT | 1 |
| 28HQ5 | 0.21 | 10 | 2 | 49 | 0.6 | 87261 | 1:59 | SAT | 1 |
| 28HQ5 | 0.90 | 82 | 7 | 25 | 1.5 | 29874 | 16:22 | WED | 0 |
| 644RM | 0.79 | 95 | 7 | 38 | 4.3 | 24411 | 18:02 | THU | 0 |
| 8AC87 | 0.62 | 50 | 6 | 29 | 3.1 | 21331 | 20:30 | SUN | 0 |

(56) References Cited

U.S. PATENT DOCUMENTS

2018/0101776 A1* 4/2018 Osotio .................. G06F 16/258
2019/0028557 A1* 1/2019 Modi ....................... G06N 3/04

* cited by examiner

| User Features 330 | | | | | | Trip Features 340 | | | Unusual User State Identification 410 |
|---|---|---|---|---|---|---|---|---|---|
| User ID 330a | Δ Data input accuracy 330b | Δ Data input speed 330c | Δ Button click behavior 330d | Δ Device angle 330e | Δ Walking speed 330f | Location 340a | Time of day 340b | Day of week 340c | |
| 28HQ5 | 0.37 | 48 | 2 | 122 | 4.3 | 87261 | 2:26 | SAT | 1 |
| B24L9 | 0.98 | 31 | 7 | 48 | 4.0 | 34892 | 13:50 | TUE | 0 |
| 8AC87 | 0.65 | 77 | 3 | 30 | 3.2 | 21331 | 9:00 | SAT | 0 |
| ZW731 | 0.40 | 16 | 1 | 50 | 3.2 | 82910 | 23:16 | FRI | 1 |
| 18AM2 | 0.88 | 46 | 8 | 12 | 2.7 | 34101 | 1:38 | SAT | 1 |
| 28HQ5 | 0.21 | 10 | 2 | 49 | 0.6 | 87261 | 1:59 | SAT | 1 |
| 28HQ5 | 0.90 | 82 | 7 | 25 | 1.5 | 29874 | 16:22 | WED | 0 |
| 644RM | 0.79 | 95 | 7 | 38 | 4.3 | 24411 | 18:02 | THU | 0 |
| 8AC87 | 0.62 | 50 | 6 | 29 | 3.1 | 21331 | 20:30 | SUN | 0 |

PREDICTING USER STATE USING MACHINE LEARNING

CROSS-REFERENCE TO RELATED APPLICATIONS

This application is a continuation of U.S. patent application Ser. No. 16/944,030, filed Jul. 30, 2020, which is a continuation of U.S. patent application Ser. No. 15/367,139, filed Dec. 1, 2016, now U.S. Pat. No. 10,762,441, both of which are incorporated by reference.

BACKGROUND

Field of Art

This disclosure relates generally to machine learning using one or more computer systems and more particularly to predicting user state using machine learning.

Description of Art

Computerized travel coordination systems provide a means of travel by connecting users requesting rides (i.e., "riders") with users available to transport them (i.e., "providers"). When a user submits a request for transport to the travel coordination system, the travel coordination system may select a provider to service the request and transport the user to a destination.

Incidents, such as safety incidents and personal conflict incidents, can occasionally occur when users and/or providers behave uncharacteristically. Although rare, such safety incidents can negatively impact the transport experience for the user and/or the provider. For example, if a user is uncharacteristically tired when requesting a trip, the user might have difficulty locating the provider's vehicle. Therefore, it is desirable to minimize impact of such safety incidents in travel coordination systems.

SUMMARY

A travel coordination system (also referred to herein as "a system" for simplicity) identifies uncharacteristic user activity and may take an action to reduce undesired consequences of uncharacteristic user states. The system uses a computer model to identify user and trip characteristics indicative of the unusual user state. A system receives information about transport services (e.g., trips) requested by users and/or provided by providers. The information includes information about trip requests submitted by users, data obtained by monitoring trips as they occur, and feedback regarding trips received from users and providers. Such monitoring and trip feedback may indicate whether a user's state was unusual during the trip or when picked up by the provider. The system uses the data about past trips to train a computer model to predict a user state of a user submitting a trip request. That is, the model is trained to predict whether the user is acting uncharacteristically by analyzing the submitted request as well as data collected about the user before and/or during the time the user submits the request (and in some instances, after submitting the request). When a user enters information to generate a ride request into a user's device, the user's device collects information about the user's activity on the user's device during data entry and includes the user activity data in the ride request to the system. The system compares the user activity data to determine the user's state. For example, the user activity can include text input characteristics, interface interaction characteristics, and device handling characteristics. For example, text input characteristics may include the number of typographical errors entered by a user or the number of characters erased by a user while entering a search query. Examples of interface interaction characteristics include the amount of time for a user to interact with the user interface after new information (or a modified display) is shown to the user, or the user's accuracy in pressing an interface element on the device. Example device handling characteristics include the angle at which the user is holding the device, movement of the device during the request entry, or a user's travel speed.

The system receives the trip request from a user and generates a prediction about the current state of the user using the computer model. To predict user state, the system compares data associated with the trip request to data about past trip requests submitted by the user. Past trip information may be parameterized to a profile of the user and identify how the user activity of the current trip request deviates from previous (or "normal") behavior for that user. The system can also compare data associated with the trip request to past trip requests submitted to the system by other users. For prior trips, such as those in which there was an incident due to unusual user behavior, deviations of user input information from a corresponding user profile are featurized to train a model that predicts user state. In an embodiment, the prediction of user state is a value representing a probability that a user is acting uncharacteristically when submitting a request.

Responsive to a user state prediction, the system may alter parameters associated with trip coordination for the requested trip. Some examples of trip variations include matching the user with only certain providers, alerting a provider about the user's possible unusual state, and modifying pickup or dropoff locations to areas that are well lit and easy to access. Different trip parameters may be altered in different situations, such as depending on the predicted likelihood that a user is acting uncharacteristically. For example, when the likelihood is comparatively very high, the user may not be matched with any provider, or limited to providers with experience or training with users having an unusual state. Similarly, when the likelihood is comparatively low (but not non-zero), the system may match the provider normally and provide a notification to the matched provider of the possible state.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

Figure (FIG. 1 is a high-level block diagram of a system environment for a travel coordination system, in accordance with some embodiments.

The figures depict an embodiment of the invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
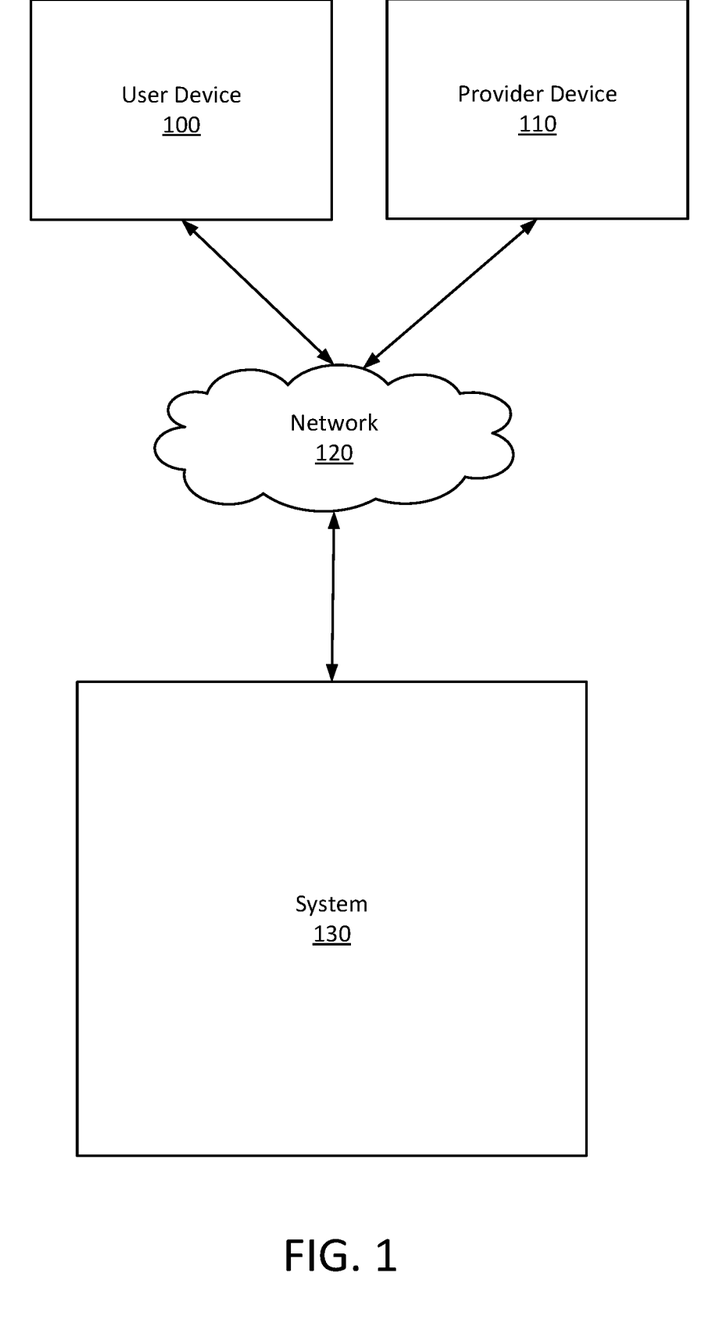

Figure (FIG. 1 is a high-level block diagram of a system environment for a travel coordination system (e.g., a network system) 130, in accordance with some embodiments. FIG. 1 includes a user device 100, a provider device 110, a network 120, and the system 130. For clarity, only one user device 100 and one provider device 110 are shown in FIG. 1. Alternate embodiments of the system environment can have any number of user devices 100 and provider devices 110, as well as multiple systems 130. The functions performed by the various entities of FIG. 1 may vary in different embodiments. The system 130 coordinates travel between a user and a provider, operating the user device 100 and provider device 110 respectively. When a user makes a request for a service (e.g., a transport or delivery service, etc.), the system 130 receives and analyzes the user's activity and characteristics of the request to determine whether it is likely that the user will behave uncharacteristically (e.g., abnormally) during a trip. If the user is likely to behave uncharacteristically, the system 130 provides appropriate modifications to the coordinated trip.

A user requests transportation from the system 130 through a user device 100. A provider receives requests to provide transportation from the system 130 through a provider device 110. User devices 100 and provider devices 110 can be personal or mobile computing devices, such as smartphones, tablets, or notebook computers. In some embodiments, the user device 100 and provider device 110 execute a client application that uses an application programming interface (API) to communicate with the system 130 through the network 120.

Through operation of the user device 100, a user can make a trip request to the system 130. For example, a trip request may include user identification information, the number of passengers for the trip, a requested type of the provider (e.g., a vehicle type or service option identifier), the current location and/or the pickup location (e.g., a user-specific location, or a current location of the user device 100), and/or the destination for the trip. The current location of the user device 100 may be designated by the user, or detected using a location sensor of the user device 100 (e.g., a global positioning system (GPS) receiver).

When a user initiates a trip request via an interface of the user device 100, the user device 100 (or corresponding application thereon) gathers data describing the user's use of the user device 100 during the generation of a trip request. This data captured during creation and submission of a trip request is termed "user activity data." The user activity data may generally describe a user's input to the user device 100, as well as the user's movement of the user device 100 itself. This activity may include text input characteristics, interface interaction characteristics, and device handling characteristics. For example, the user may interact with several user interfaces during the generation of a trip request, such as setting a pickup location of the trip, selecting settings for the trip, entering a search string to identify a destination of the trip, and so forth. The speed at which a user interacts with these interfaces (e.g., average time on a particular input screen, time between interactions) may be identified, as well as a user's interaction with a search query interface. For example, such user request data may include the rate at which a user enters search query terms, or the number of characters deleted before entering a search query or selecting a search result.

In addition to direct user input with the interface or inputs of user device 100, the user device 100 may also gather information from sensors on the device, such as gyroscopes and accelerometers to identify a position and orientation of the user device 100. The user device 100 may also identify a location of the user device 100 and its movement during interaction with the user device 100 to determine the speed of travel of the user operating the device.

The user request data may be parameterized by the user device 100, or the user device 100 may send user request data to the system 130 for parameterization of the user request data. Certain user request data may be parameterized at the user device 100, while other data may be generated by the system 130 based on device interaction data from the user device 100. Accordingly, though referred to generally as a "trip request," user request data for a given trip request may be sent to the system in a series of messages from the user device 100 as a user interacts with the interface to select various parameters for the trip.

A provider can use the provider device 110 to interact with the system 130 and receive invitations to provide transportation for users. In some embodiments, the provider is a person operating a vehicle capable of transporting passengers. In some embodiments, the provider is an autonomous vehicle that receives routing instructions from the system 130. For convenience, this disclosure generally uses a car with a driver as an example provider. However, the embodiments described herein may be adapted for a provider operating alternative vehicles.

A provider can receive assignment requests through the provider device 110. An assignment request identifies a user who submitted a trip request to the system 130 and identifies the pickup location of the user for a trip. For example, the system 130 can receive a trip request from a user device 100, select a provider from a pool of available (or "open") users to provide the trip, and transmit an assignment request to the selected provider's provider device 110. In some embodiments, a provider can indicate availability, via a client application on the provider device 110, for receiving assignment requests. This availability may also be referred to herein as being "online" (available to receive assignment requests) or "offline" (unavailable to receive assignment requests). For example, a provider can decide to start receiving assignment requests by going online (e.g., by launching a client application or providing input on the client application to indicate that the provider wants to receive invitations), and stop receiving assignment requests by going offline. In some embodiments, when a provider device 110 receives an assignment request, the provider has the option of accepting or rejecting the assignment request. By accepting the assignment request, the provider is assigned to the user, and is provided the user's trip details, such as pickup location and trip destination location. In one example, the user's trip details are provided to the provider device 110 as part of the invitation or assignment request.

In some embodiments, the system 130 provides routing instructions to a provider through the provider device 110 when the provider accepts an assignment request. The routing instructions can direct a provider from their current location to the location of the user or can direct a provider to the user's destination. The provider device 110 can present the routing instructions to the provider in step-by-step instructions or can present the entire route at once.

User devices 100 and provider devices 110 may interact with the system 130 through client applications configured to interact with the system 130. The client applications of the user devices 100 and provider devices 110 can present information received from the system 130 on a user interface, such as a map of the geographic region, and the current location of the user device 100 or provider device 110. The client application running on the user device 100 or provider device 110 can determine the current location and provide the current location to the system 130.

The user devices 100 and provider devices 110 can communicate with the system 130 via the network 120, which may comprise any combination of local area and wide area networks employing wired or wireless communication links. In some embodiments, all or some of the communication on the network 120 may be encrypted.

As described above, the system 130 matches users requesting transportation with providers that can transport the users from their pick up location to their destination. The system 130 can store maps of geographic regions in which the system 130 services users and providers, and may provide information about these maps to users and providers through the user devices 100 and provider devices 110. For example, the system 130 may provide routing directions to the provider to pick up the user and transport the user to their destination. Furthermore, while examples described herein relate to a transportation service, the system 130 can enable other services to be requested by requestors, such as a delivery service, food service, entertainment service, etc., in which a provider is to travel to a particular location.

Figure 2:
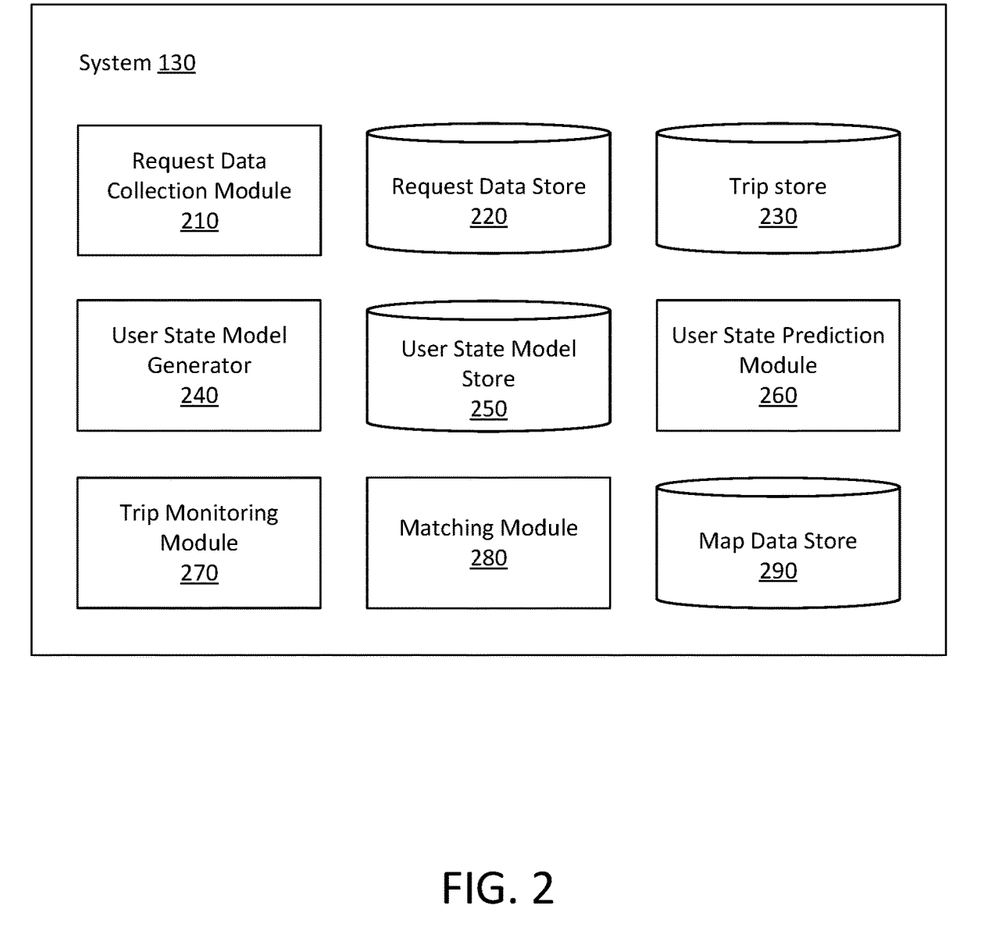
FIG. 2 is a high-level block diagram of a system architecture for a travel coordination system, in accordance with some embodiments.

FIG. 2 is a high-level block diagram of a system architecture for the travel coordination system 130, in accordance with some embodiments. The system includes various modules and data stores to process trip requests, match providers, monitor trips, and predict and account for unusual user state. The system 130 comprises a request data collection module 210, a request data store 220, a trip store 230, a user state model generator 240, a user state model store 250, a user state prediction module 260, a trip monitoring module 270, a matching module 280, and a map data store 290. Computer components such as web servers, network interfaces, security functions, load balancers, failover servers, management and network operations consoles, and the like are not shown so as to not obscure the details of the system architecture. Additionally, the system 130 may contain more, fewer, or different components than those shown in FIG. 2 and the functionality of the components as described herein may be distributed differently from the description herein.

The request data collection module 210 receives trip requests from the user device 100. Generally, the request data collection module 210 collects incoming trip requests from user devices and identifies request data describing the requested trip from the user. The request data collection module 210 may receive the request data in batches or it may receive a continuous stream of information. In one example, the request data can include a user identifier, a current location of the user, the specified pickup location and/or destination location, a service type (e.g., a vehicle type), and/or other data associated with the requested service.

According to one example, the request data also includes the user activity data of a user's interaction with the user device that may be indicative of user state. In other examples, the user activity data can be received separately from the request data (e.g., before, after, or concurrently with receipt of the request data). The request data collection module 210 may process the user activity data to identify user features and/or trip features for the trip request. User features relate to the way a user inputs information via the user device 100 (e.g., the number of typos occurring in a request). User features may also relate to other aspects of a user's behavior, such as the user's walking speed at the time the request is submitted. Trip features may include spatial and temporal data related to a trip request (e.g., the time of day and location from which a user requests the trip or trip pickup location). As discussed below, user features may directly represent the user activity data (e.g., the user is walking 1.5 m/s) or may represent a difference between the user activity data for the current request compared to a profile of the user (e.g., a user is walking 1.0 m/s slower than normal).

The request data store 220 stores trip requests and associated metadata about the trip requests collected by the request data collection module 210. The stored data may include features that are associated with trip requests, such as user features and trip features.

The user state prediction module 260 predicts a current user state based on trip request features. The user state prediction module 260 determines a user state prediction by applying the features to a trained user state model stored in the user state model store 250. The user state model is trained to predict user state using past features in conjunction with previously-identified unusual user states. The prior requests are stored in the request data store 220. In one embodiment, the user state prediction module 260 compares the user features associated with the incoming request against features from past requests from different users or against features from past requests by the same user. That is, the user state prediction module 260 detects whether the user has input data in a way that is unusual for that particular user and/or in a way differing from normal user behavior that is similar to the differences for other users having unusual behavior. The user state prediction module 260 may further incorporate trip features when predicting user state. For example, the user state prediction module 260 incorporates the location of the user device 100 and the time of the trip request when determining a user state prediction (e.g., if the request is made in a location that is prone to unusual behavior or safety incidents). The user state prediction module 260 outputs a prediction (i.e., a probability) that indicates whether the user is behaving uncharacteristically. The features used for a user state model and training thereof are further discussed below with respect to the user state model generator 240 and FIGS. 3-4.

The matching module 280 selects a provider to service a trip request from a user. The matching module 280 receives a trip request from a user and determines a set of candidate providers that are online, open (i.e., are available to transport a user), and near the requested pickup location for the user. The matching module 280 selects a provider from the set of candidate providers and transmits an assignment request to the selected provider. The provider can be selected based on the provider's location, the user's pickup location, the type of the provider, the amount of time the provider has been waiting for an assignment request and/or the destination of the trip, among other factors. In some embodiments, the matching module 280 selects the provider who is closest to the pickup location or who will take the least amount of time to travel to the pickup location (e.g., having the shortest estimated travel time to the pickup location). The matching module 280 sends an assignment request to the selected provider. If the provider accepts the assignment request, the matching module 280 assigns the provider to the user. If the provider rejects the assignment request, the matching module 280 selects a new provider and sends an assignment request to the provider device 110 for that provider.

The matching module 280 additionally identifies appropriate changes that can be made to the parameters of the trip based on the predicted user state and matches (e.g., assigns) a provider to a user accordingly. Some examples of alterations to the trip parameters include alerting the provider about the predicted state of the user via a text message or other notification sent to the provider device 110, providing the user with different directions to the pickup location, using a different or altered mapping system to help ensure that the user arrives successfully at the pickup location and finds the provider, selecting a safer meeting place (e.g., in more well-lit areas), giving the user more time to reach the pickup location (e.g., by scheduling the provider to arrive at the pickup location later), assigning specific providers to users with certain predicted user states (e.g., assigning more experienced providers or providers who have a history of picking up users in an unusual state), and preventing a user from joining a trip with additional users (e.g., a carpool).

The map data store 150 stores maps of geographic regions in which the system 130 offers trip coordination services. The maps contain information about roads within the geographic regions. For the purposes of this disclosure, roads can include any route between two places that allows travel by foot, motor vehicle, bicycle or other form of travel. Examples of roads include streets, highways, freeways, trails, bridges, tunnels, toll roads, or crossings. Roads may be restricted to certain users, or may be available for public use. Roads can connect to other roads at intersections. An intersection is a section of one or more roads that allows a user to travel from one road to another. Roads are divided into road segments, where road segments are portions of roads that are uninterrupted by intersections with other roads. For example, a road segment would extend between two adjacent intersections on a surface street or between two adjacent entrances/exits on a highway.

A map of a geographic region may be represented using a graph of the road segments. In some embodiments, the nodes of a graph of a map are road segments and edges between road segments represent intersections of road segments. In some embodiments, nodes of the graph represent intersections between road segments and edges represent the road segments themselves. The map data store 150 also stores properties of the map, which may be stored in association with nodes or edges of a graph representing the map. Map properties can include road properties that describe characteristics of the road segments, such as speed limits, road directionality (e.g., one-way, two-way), traffic history, traffic conditions, addresses on the road segment, length of the road segment, and type of the road segment (e.g., surface street, residential, highway, toll). The map properties also can include properties about intersections, such as turn restrictions, light timing information, throughput, and connecting road segments. In some embodiments, the map properties also include properties describing the geographic region as a whole or portions of the geographic region, such as weather within the geographic region, geopolitical boundaries (e.g., city limits, county borders, state borders, country borders), and topological properties.

The trip monitoring module 270 receives trip data (also herein referred to as "service data") about trips as trips occur. Initially, the trip data includes user features and trip features from the trip request. The trip data may also reflect monitored data from the trip during transport of the user. In addition, during the trip or when the trip is complete, a provider may identify the user of the trip as having an unusual state during the trip or otherwise provide feedback of the user. Trip data can additionally include feedback about the trip such as ratings and incident reports submitted by users and providers, and information about trip requests submitted by users.

Trip data collected by the trip monitoring module 270 is stored in the trip store 230. The trip store 230 holds data about completed trips. The stored trip data can include the request that initiated the trip and associated metadata (i.e., user features and trip features), data collected from the user device 100 and the provider device 110 over the duration of the trip, and ratings and incident reports submitted by users and providers regarding the trip experience. In one embodiment, the provider may submit an incident report indicating the apparent user state of the user who made the trip request.

The user state model generator 240 generates a user state prediction model. The model predicts whether a user submitting a trip request is in a normal state or an uncharacteristic state (i.e., whether the user's actions are not aligned with actions that would be expected of the user under normal circumstances). In one embodiment, the user state prediction model is a machine learned model.

An embodiment of the user state model generator 240 generates the user state prediction model using supervised machine learning. The user state model generator 240 trains and validates the models using training data derived from the request data stored in the request data store 220 and the trip data stored in the trip store 230. The user state model generator 240 uses user features and trip features from past trips with associated submitted feedback about user state as validated data for training the model. In one embodiment, the safety incident prediction models are re-generated using updated training data on a periodic basis, such as every 30 days. In some embodiments, the safety incident prediction models are re-generated whenever updated training data is received. The user state model store 250 stores the information about the generated user state prediction model.

Figure 3:
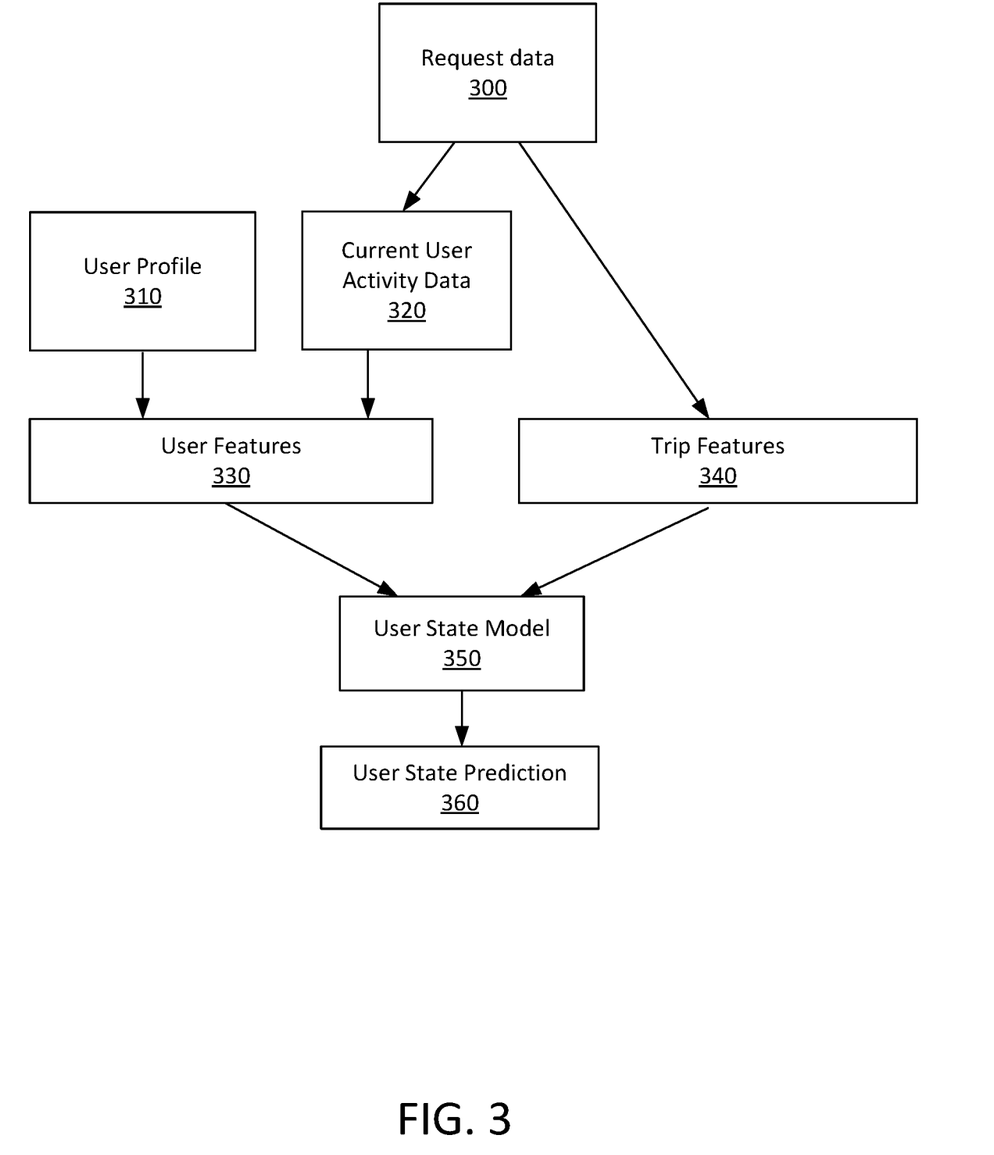
FIG. 3 is a data flow diagram illustrating a data flow from request data to a user state prediction, in accordance with some embodiments.

FIG. 3 is a data flow diagram illustrating a data flow from request data to a user state prediction, in accordance with some embodiments. Alternate embodiments of FIG. 3 may include more, fewer, or different steps, and the steps may be performed in an order different from what is illustrated in FIG. 3 and described herein.

Request data 300 is received at the system 130 from a user device 100. Trip features 340 are extracted from the request data 300. The trip features 340 are features that are related to the requested trip, such as location, geographical, and time features that are unrelated to the behavior of the user (e.g., on the device) making the request. For example, trip features 340 may include user location, weather conditions, the time of day, and the day of the week on which the request is submitted. According to some variations, some trip features are determined by the system 130 rather than being determined from the request data 300 (e.g., time and/or day of week, weather conditions, etc.).

Current user activity data 320 is also extracted from the request data 300 (or in some examples, is received independently from the request data 300). Current user activity data 320 includes information about the behavior and characteristics of the user's interaction with the client device when the request was submitted. In one embodiment, the current user activity data is obtained using various sensors that are integrated into the user device 100, such as motion sensors, device angle sensors, GPS, and touch sensors built into a screen. Some examples of current user activity data include the speed at which the user was walking at or near the time the request was submitted, the angle at which the user held the user device 100 (e.g., with respect to a horizontal or vertical plane) when making the request, the accuracy and speed at which the request is input, and interface interaction behavior such as the precision with which the user clicks on links and buttons on the user interface of the system 130.

A user profile 310 comprises a description of prior user activity data of a user, which may be determined from prior request data 300 received for a particular user for past trips taken by the user. The profile may indicate typical activity for that user. The system 130 stores a user profile for each user. In one embodiment, the user profile 310 is stored in the trip store 230. In some embodiments, user profiles 310 may be stored on the system 130 in a separate user profile store.

According to an example, user features 330 are determined by comparing or otherwise combining current user activity data 320 and user profile data 310. In other examples, user features 330 can be determined from current user activity data 320 by itself and/or in comparison with other users' data. The user state model generator 240 determines an average value for each of the user features 330 stored for the user. The average value is calculated using some or all of the information for each behavioral feature stored for that user in a user profile 310. For example, a user's average walking speed may be determined by calculating the average of all the walking speeds recorded for the user during past ride requests submitted by the user. In one embodiment, values associated with requests having an uncharacteristic state are discarded and average values are calculated using only the remaining data (i.e., determining average values representative of a characteristic or 'normal' state of the user). In other embodiments, past user activity data values may be aggregated in alternative ways such as by determining median values instead of averages, or by considering each request individually.

The user features 330 associated with the request data 300 are calculated by finding the difference between the current user activity data 320 and the averages determined from the data from the user profile 310. The user features 330 thus represent an extent to which the current user behavior deviates from behavior that is characteristic of the user in general. In one embodiment, if a particular user profile does not contain enough data about previous requests from the user (e.g., if the user is new to the system) the current user activity data 320 is compared to a combination of user profile data from other users. For example current user activity data 320 for a new user might be compared to an average value of user profile data from other users who are similar to the user in some way (e.g., same age, or region).

The user features 330 and trip features 340 are input into a user state model 350. The user state model 350 is trained using information about user features 330 and/or trip features 340 for some or all users of the system 130. The user state model compares the user features 330 and trip features 340 from the current request based on the user features 330 and trip features 340 associated with unusual states associated with past ride requests submitted by various users. The user state model 350 includes information about whether the user in each of the past ride requests was predicted or known to be behaving uncharacteristically. This data can include validation data submitted about a user (e.g., provider feedback indicating that the user was acting strangely or erratically), and/or a user state prediction made by the user state model 350 for a past ride request.

The user state model 350 generates a user state prediction 360 indicating whether the user submitting the request is acting uncharacteristically (e.g., in the user's interactions with the user device. The user state prediction 360 may be a binary value indicating that the user is or is not acting uncharacteristically, or the prediction may be a value in a range. For example, the user state prediction 360 may be a probability (e.g. a value from 0 to 1) indicating a likelihood that the user is behaving uncharacteristically.

Figure 4:
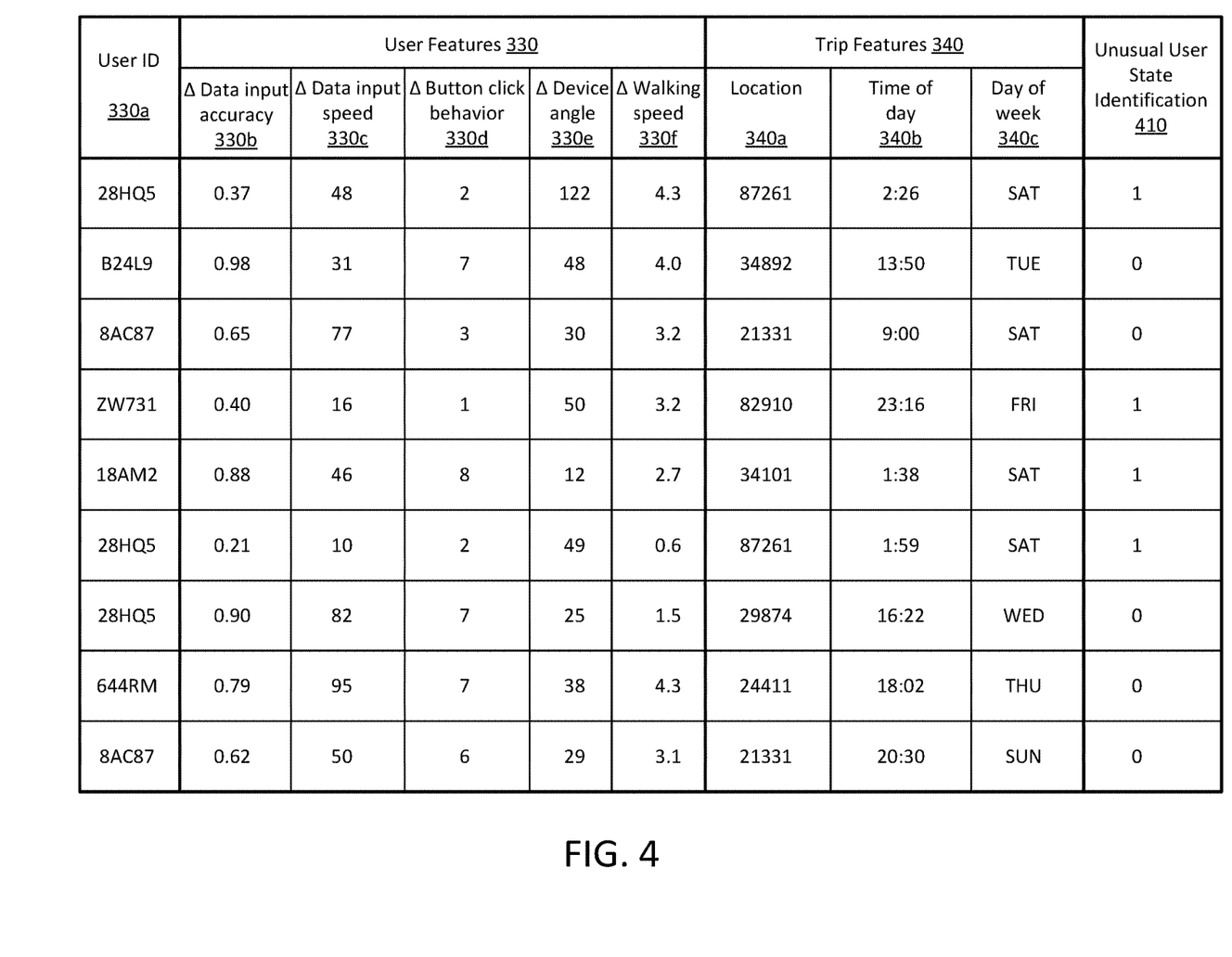
FIG. 4 illustrates an example of training data for a user state model, in accordance with some embodiments.

FIG. 4 illustrates an example of training data for a user state model 350, in accordance with some embodiments. The training data for training the user state model 350 comprises user identification 330a, user features 330, trip features 340, and unusual user state identifications 410 for some or all ride requests received at the system 130, according to an embodiment. In the example shown in FIG. 4, each row represents one request sent by a user to the system 130.

The unusual user state identification 410 value can be a binary value (as shown in FIG. 4) indicating whether or not the user was known to be behaving unusually or uncharacteristically at or near the time the corresponding request was sent. Alternatively, the unusual user state identification 410 can be a value (e.g., between 0 and 1) representing the likelihood that the user was acting uncharacteristically at the time of the request.

User features 330 include information about the user, collected by the user device 100 at the time the user submits a request. In one embodiment, user features 330, stored as training data for the user state model 350, are values indicative of the differences between a user's average characteristic behavior and the user's observed behavior at the time the request was submitted. As shown in FIG. 4, user features 330 may include Δ data input accuracy 330b, Δ data input speed 330c, Δ button click behavior 330d, Δ device angle 330e, and Δ walking speed 330f. The Δ data input accuracy 330b is a measure of how many additional or fewer typos are included in a request compared to an average request from the user, according to an embodiment. The Δ data input speed 330c represents how much faster or slower the user was at completing a ride request compared to an average time for the user. The Δ button click behavior 330d is a measure of the accuracy of the user's button clicks, as compared to the usual accuracy of the user. The Δ device angle 330e represents the difference between the average angle at which the user typically holds the user device 100 when submitting a request and the angle at which the user held the user device 100 while submitting the particular request. The Δ walking speed 330f is a measure of how much faster or slower the user was walking when submitting the request compared to the user's average walking speed when submitting a request. The training data for the user state model 350 may include user features 330 not shown in the example given in FIG. 4.

The trip features 340 include information about the ride request describing the trip request unrelated to the user interactions. According to an embodiment, the values stored for trip features 340 are representative of the values observed at or near the time of the request, rather than measures of the difference between the observed values and an average of past values. As shown in FIG. 4, trip features 340 include location 340a, time of day 340b, and day of week 340c. The location 340a is a representation of a geographical position of the user device 100 at the time the ride request is submitted. Location 340a can be represented in various ways, for example as a location identification number or GPS coordinates. The time of day 340b represents the time at which the request is submitted by the user. The day of week 340c represents the day the user submitted the request. The training data for the user state model 350 may include trip features 340 not shown in the example given in FIG. 4. For example, trip features 340 could include a feature indicating whether or not the day the user submitted the request was a holiday.

The user state model 350 is trained with user features 330 and trip features 340 for some or all user requests received by the system. The user state model 350 is a supervised machine learning model predicting an outcome or classification, such as decision trees, support vector machines, or neural networks. According to an embodiment, the user state model 350 is updated whenever a new request is received by the system. In other embodiments, the user state model 350 is re-generated at predetermined times such as once a day or once a week. After the user state model generator 240 generates a new version of the user state model, it is stored in the user state model store 250. The user state model 350 is used by the user state prediction module 260 to determine whether an incoming request is similar to known data with recorded unusual user state identifications 410 and thus to predict a user state for the user who submitted the request.

Figure 5:
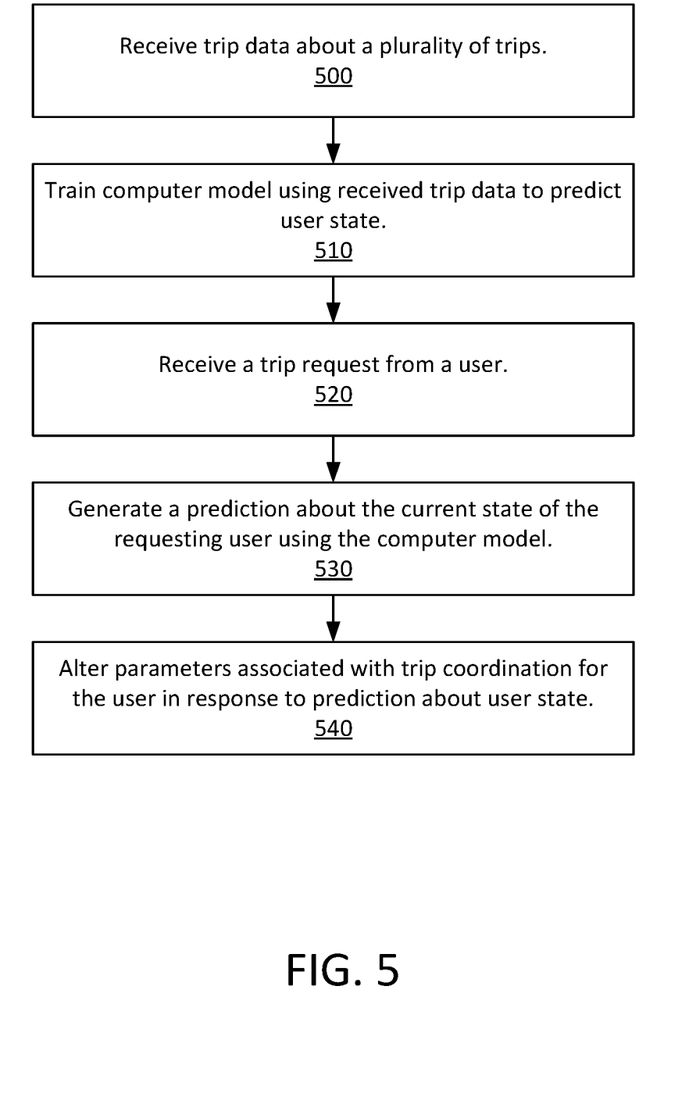
FIG. 5 is a flowchart illustrating a method of predicting user state, in accordance with some embodiments.

FIG. 5 is a flowchart illustrating a method of predicting user state, in accordance with some embodiments. A system 130 receives 500 trip data about a plurality of trips. The trip data comprises trip requests submitted by users who want to receive trips from providers associated with the system 130. The system 130 trains 510 a computer model to predict a user state of a user who submits a trip request. The computer model is created using past trip requests the system 130 has received from some or all of the users who have submitted trip requests. Data about past trip requests that is incorporated into the model may also include validation data indicating whether a trip request and its features were associated with a user in an uncharacteristic user state.

The system 130 receives 520 a trip request from a user. A trip request includes information about the current behavior of the user and information about trip features that are independent of the user such as weather and time of day. The system 130 generates 530 a prediction about the current state of the user who requested the pickup. A prediction about the state of a user may be a binary value indicating whether or not the user is in an uncharacteristic state. In one embodiment, a prediction about the state of a user is a probability (e.g., a value between 0 and 1) indicating the likelihood that the user is in an uncharacteristic state. The system 130 alters 540 parameters associated with trip coordination in response to the prediction about user state.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure. For example, while the present disclosure discusses predicting provider involvement in potential safety incidents, the methods and systems herein can be used more generally for any purpose where one would want to predict involvement in potential incidents using a machine learning model.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method for predicting user state in relation to a service, comprising:
   receiving, from a first user device of a first user, a request to provide the service;
   responsive to receiving the request to provide the service, receiving service data including service features and user features, the service features representing information about services provided to users and the user features representing information derived from current user activity data received from the first user device of the first user during provision of the service and past services requested by the first user;
   generating a plurality of user feature values for the first user, wherein each user feature value is determined based on a difference between an average of values associated with the past services requested by the first user and a value derived from the current user activity data of the first user;
   generating a prediction of a state of the first user by providing the generated plurality of user feature values for the first user and at least some of the service features as input to a machine learning model that has been trained using supervised learning to predict user state, wherein the prediction of the state of the first user is generated based on past services provided to the users, the past services provided to users including at least one past service provided to the first user and at least one past service provided to another user other than the first user;

dynamically altering one or more parameters associated with a manner in which the service is coordinated for the first user during provision of the service based on the prediction about the state of the first user; and providing, via a wireless communication link, the altered one or more parameters to a provider client device of a provider of the service to cause a modification to the manner in which the service is coordinated for the first user.

2. The computer-implemented method of claim 1, wherein the current user activity data comprises one or more of: data input accuracy, data input speed, interface interaction behavior, device angle, or walking speed.

3. The computer-implemented method of claim 1, wherein the current user activity data comprises one or more of: a location of the first user when the first user requests the service, a time of day when the first user requests the service, or a day of a week when the first user requests the service.

4. The computer-implemented method of claim 1, wherein altering one or more parameters associated with the manner in which the service is coordinated for the first user based on the prediction about the state of the first user comprises alerting a provider about the state of the first user.

5. The computer-implemented method of claim 1, wherein altering one or more parameters associated with the manner in which the service is coordinated for the first user comprises selecting an alternative drop-off location at which provision of the service ends.

6. The computer-implemented method of claim 1, wherein the prediction of the state of the first user is a prediction of an unusual state of behavior.

7. The computer-implemented method of claim 6, furthering comprising:

providing, in response to determining that the state of the first user is an unusual state of behavior, a message to the first user device requesting feedback from the first user; and receiving feedback from the first user, wherein altering the one or more parameters associated with the manner in which the service is coordinated for the first user is further based on the feedback from the first user.

8. The computer-implemented method of claim 1, wherein, when the user features of the first user includes less than a threshold amount of user data for the first user, the user features of the first user includes user data of other users of a network system.

9. The computer-implemented method of claim 1, wherein the service data includes monitored data from the service captured while the service occurs.

10. The computer-implemented method of claim 1, wherein the service data includes information about the service collected from the first user.

11. A non-transitory computer-readable storage medium storing computer program instructions executable by a processor of a system to perform steps for predicting user state comprising:

receiving, from a first user device of a first user, a request to provide a service;

receiving service data including service features and user features, the service features representing information about services provided to users and the user features representing information derived from current user activity data received from the first user device of the first user during provision of the service and past services requested by the first user;

generating a plurality of user feature values for the first user, wherein each user feature value is determined based on a difference between an average of values associated with the past services requested by the first user and a value derived from the current user activity data of the first user;

generating a prediction of a state of the first user by providing the generated plurality of user feature values for the first user and at least some of the service features as input to a machine learning model that has been trained using supervised learning to predict user state, wherein the prediction of the state of the first user is generated based on past services provided to the users, the past services provided to users including at least one past service provided to the first user and at least one past service provided to another user other than the first user;

dynamically altering one or more parameters associated with a manner in which the service is coordinated for the first user during provision of the service based on the prediction about the state of the first user; and providing, via a wireless communication link, the altered one or more parameters to a provider client device of a provider of the service to cause a modification to the manner in which the service is coordinated for the first user.

12. The non-transitory computer-readable storage medium of claim 11, wherein the current user activity data comprises one or more of: data input accuracy, data input speed, interface interaction behavior, device angle, or walking speed.

13. The non-transitory computer-readable storage medium of claim 11, wherein the current user activity data comprises one or more of: a location of the first user when the first user requests the service, a time of day when the first user requests the service, or a day of a week when the first user requests the service.

14. The non-transitory computer-readable storage medium of claim 11, wherein altering one or more parameters associated with the manner in which the service is coordinated for the first user based on the prediction about the state of the first user comprises alerting a provider about the state of the first user.

15. The non-transitory computer-readable storage medium of claim 11, wherein altering one or more parameters associated with the manner in which the service is coordinated for the first user based on the prediction about the state of the first user comprises selecting an alternative drop-off location at which provision of the service ends.

16. The non-transitory computer-readable storage medium of claim 11, wherein the prediction of the state of the first user is a prediction of an unusual state of behavior.

17. The non-transitory computer-readable storage medium of claim 16, further comprising:

providing, in response to determining that the state of the first user is an unusual state of behavior, a message to the first user device requesting feedback from the first user; and receiving feedback from the first user, wherein altering the one or more parameters associated with the manner in which the service is coordinated for the first user is further based on the feedback from the first user.

18. The non-transitory computer-readable storage medium of claim 11, wherein, when the user features of the first user includes less than a threshold amount of user data for the first user, the user features of the first user includes user data of other users of a network system.

19. The non-transitory computer-readable storage medium of claim 11, wherein the service data includes monitored data from the service captured while the service occurs.

20. The non-transitory computer-readable storage medium of claim 11, wherein the service data includes information about the service collected from the first user.

\* \* \* \* \*